United States Patent
Kumble Seetharama et al.

(10) Patent No.: US 11,765,024 B2
(45) Date of Patent: Sep. 19, 2023

(54) AUTOMATIC PROVISIONING OF A COMPUTING DEVICE WITH OPERATING SYSTEM AND NETWORK PROCESSING FUNCTIONS

(71) Applicant: Hewlett Packard Enterprise Development LP, Houston, TX (US)

(72) Inventors: Sandeep Kumble Seetharama, Karnataka (IN); Nilakantan Mahadevan, Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/214,014

(22) Filed: Mar. 26, 2021

(65) Prior Publication Data

US 2021/0336845 A1    Oct. 28, 2021

(51) Int. Cl.
*H04L 41/0806* (2022.01)
*H04L 41/0859* (2022.01)
(Continued)

(52) U.S. Cl.
CPC ........ *H04L 41/0806* (2013.01); *G06F 9/4406* (2013.01); *H04L 41/0859* (2013.01); *H04L 41/0863* (2013.01); *H04L 41/0886* (2013.01)

(58) Field of Classification Search
CPC ..... G06F 8/60; G06F 8/61; G06F 8/63; G06F 9/44; G06F 9/4401; G06F 9/4406; G06F 9/4411; G06F 9/4416; H04L 41/0803; H04L 41/0806; H04L 41/084; H04L 41/0859; H04L 41/0863; H04L 41/0866; H04L 41/0886
See application file for complete search history.

(56) References Cited

U.S. PATENT DOCUMENTS 6,202,111 B1 *  3/2001  Wallach ............. H04L 41/0806
                                                 710/62
7,330,967 B1 *  2/2008  Pujare .................. G06F 9/4411
                                                 717/170
(Continued)

FOREIGN PATENT DOCUMENTS

CN     108566297 A  *  9/2018  .......... G06F 9/4416
CN     109167687 A      1/2019
(Continued)

OTHER PUBLICATIONS

"What Makes a NIC a SmartNIC, and Why Is It Needed?" Netronome, Sep. 13, 2016, https://www.netronome.com/blog/what-makes-a-nic-a-smartnic-and-why-is-it-needed/. (Year: 2016).*

(Continued)

*Primary Examiner* — Vivek Srivastava
*Assistant Examiner* — William C McBeth
(74) *Attorney, Agent, or Firm* — Slater Matsil, LLP (57) ABSTRACT

Examples include systems and methods for providing automatic techniques for provisioning a computing device with an operating system and network processing functions. Some examples include automatically initiating a network handling module for configuring or programming a network interface card in a computing device to enable a network processing function while rebooting the computing device post operating system installation.

20 Claims, 4 Drawing Sheets

(51) Int. Cl.
*G06F 9/4401* (2018.01)
*H04L 41/08* (2022.01)

(56) References Cited

U.S. PATENT DOCUMENTS

| | | | | |
|---|---|---|---|---|
| 8,533,830 | B1* | 9/2013 | Dalcher | G06F 9/4406 713/192 |
| 8,631,163 | B1* | 1/2014 | Huang | H04L 41/0806 709/225 |
| 10,628,170 | B1* | 4/2020 | Chaganti | G06F 9/4406 |
| 11,055,106 | B1* | 7/2021 | Cochell | G06F 9/4406 |
| 2002/0108002 | A1* | 8/2002 | Gifford, Jr. | H04L 41/0806 710/36 |
| 2002/0122076 | A1* | 9/2002 | Nakaki | G06F 3/0481 715/847 |
| 2003/0069947 | A1* | 4/2003 | Lipinski | H04L 41/0806 709/220 |
| 2004/0006688 | A1* | 1/2004 | Pike | G06F 9/4406 713/1 |
| 2004/0123091 | A1* | 6/2004 | Das | H04L 41/0806 713/2 |
| 2007/0110077 | A1* | 5/2007 | Takashige | H04L 41/0803 370/254 |
| 2007/0260868 | A1* | 11/2007 | Azzarello | G06F 9/4406 713/2 |
| 2009/0106753 | A1 | 4/2009 | Wang et al. | |
| 2010/0082783 | A1* | 4/2010 | Kohn | G06F 9/4416 709/222 |
| 2011/0320799 | A1* | 12/2011 | Lam | H04L 41/0873 713/2 |
| 2014/0040887 | A1* | 2/2014 | Morariu | G06F 9/45558 718/1 |
| 2018/0189069 | A1* | 7/2018 | Huang | G06F 9/44 |
| 2021/0226846 | A1* | 7/2021 | Ballard | H04L 41/0806 |
| 2021/0240491 | A1* | 8/2021 | Downum | G06F 9/4406 |

FOREIGN PATENT DOCUMENTS

| | | | | |
|---|---|---|---|---|
| CN | 109245925 | A | | 1/2019 |
| CN | 109379215 | A * | 2/2019 | ........... G06F 9/4416 |
| CN | 109445800 | A | | 3/2019 |
| CN | 110187896 | A | | 8/2019 |

OTHER PUBLICATIONS

"Enhancing Networks with SmartNICs: Defining Intelligent Interconnects and their Role in Today's Data Centers". Mellanox Technologies Solution Brief. 2018. (Year: 2018).*

"An Introduction to SmartNICs." The Next Platform, Mar. 12, 2019, https://www.nextplatform.com/2019/03/04/an-introduction-to-smartnics/. (Year: 2019).*

Citrix, "Citrix Hypervisor 8.1", Citrix Product Documentation, Feb. 13, 2020, 754 pages.

Marvell, "Data Processing Units | Empowering Carrier, Enterprise and Cloud Data Services", available online at <https://www.marvell.com/products/data-processing-units.html>, 2021, 9 pages.

Microsoft, "Unattended Windows Setup Reference", available online at <https://docs.microsoft.com/en-us/windows-hardware/customize/desktop/unattend/>, Apr. 30, 2018, 2 pages.

Red Hat, "Automated Installation Red Hat Enterprise Linux 7", available online at (https://access.redhat.com/documentation/en-US/red_hat_enterprise_linux/7/html/installation_guide/sect-automated-nstallation>, 2021, 1 page.

* cited by examiner

AUTOMATIC PROVISIONING OF A COMPUTING DEVICE WITH OPERATING SYSTEM AND NETWORK PROCESSING FUNCTIONS

BACKGROUND

A network adapter such as a network interface card (NIC) is a computer hardware component that connects a computing device to a network. In an example, a computing device, such as a server, may be equipped with one or more NICs to allow the computing device to communicate with remote devices via a communication network such as an Ethernet network. In some examples, NIC(s) may further offer various additional functionalities. For example, a NIC (referred to as a smart NIC) may perform network processing functions.

BRIEF DESCRIPTION OF THE DRAWINGS

For a more complete understanding of various examples, reference is now made to the following description taken in connection with the accompanying drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

Network processing functions may be processing activities or tasks that may be related to security, performance, and customization to attain efficient network processing in a network. Some examples of network processing functions may include framing, verification, classification, modification, encryption, compression, tunneling, and traffic shaping. In order to ensure efficient network processing, a computing device coupled to the network may be implemented with various applications/software to perform various network processing functions. In addition, network processing devices such as switches, routers, security devices, accelerators may be implemented in the network to enhance the performance and perform other certain network processing functions (e.g., intrusion detection, performance acceleration functions and network virtualization).

As discussed, NICs may, generally, be used to connect computing devices to the networks such as Ethernet network. In some examples, a NIC (e.g., a smart NIC) may employ its own processor (e.g., field programmable gate arrays (FPGAs), programmable ASIC or system-on-chip (SOC)) to enable various network processing functions. That is, the NIC may be able to perform, using its own processor, various network processing functions. In some examples, a NIC may execute one or more network processing functions that a processor (e.g., a central processing unit (CPU) of a server) of a computing device generally handles. This way, the NIC may offload such functions from the processor to the network and free up the processor for its primary applications tasks. In addition, a NIC may also be enabled with one or more other network processing functions that may, generally, be performed by the network processing devices.

In order to enable these network processing functions on a NIC (e.g., a smart NIC) implemented in a computing device, it may be required to orchestrate the NIC with corresponding network configurations (e.g., complex network configurations). Complex network configurations may refer to network configurations, when configured or programmed on a NIC, which may enable the NIC to perform network processing functions. In some examples, NIC(s) in a computing device may be configured or programmed with complex network configurations to enable the NIC(s) to perform network processing functions according to desired end use requirement. However, such orchestration of NIC(s) with desired complex network configurations may be performed after an operating system is deployed on the computing device because unattended techniques (e.g., automatic techniques) for operating system installation (OS installation) may have limited capability.

OS installation, in a computing device, using unattended techniques may provide a mechanism to configure NIC(s)

with basic network configurations during OS installation. Basic network configurations may refer to network configurations (e.g., L3 configurations) that enable a NIC to achieve network connectivity and enable communication protocols with necessary gateway and routing information for establishing communication with the network. In these instances, the NIC(s) may be provided with addresses (e.g., a virtual Media Access Control (MAC) address and an Internet Protocol (IP) address). However, these techniques cannot provide any mechanism to orchestrate NIC(s) with the complex network configurations. In some examples, manual intervention may be required for orchestrating these complex network configurations on NIC(s). In addition, discrete steps may be performed for configuring the NIC for each complex network configuration. In some examples, a configuration may fail while performing the steps due to the presence of already configured contradicting configuration on NIC(s). Accordingly, these processes may be complicated, time consuming and error-prone. Furthermore, the non-availability of mechanisms for orchestrating complex network configurations during the OS installation may impede end-to-end automation of provisioning computing devices because it may require manual intervention to enable network processing functions on NIC(s).

As used herein, the term "computing device" may, for example, refer to a device including a processor, memory, and input/output interfaces for wired and/or wireless communication. In an example, the computing device may include a device including a non-volatile memory (NVM). The computing device may include, without limitation, a server, a desktop computer, a laptop, a tablet computer, a mobile device, a personal digital assistant (FDA), an embedded system, a management system, a switch, a router, or a workstation. In an example, the computing device may be a part of a datacenter. As used herein, the term "server" may include a computer (e.g., hardware) and/or a computer program (machine-readable instructions) that may process requests from other (client) computers over a network.

Operating system is a system software that manages hardware and software resources of a computing device and provides common services for computer programs. The operating system can be executable on a processor (e.g., CPU) and loaded to a memory coupled to the processor in the computing device. The operating system may be a high level operating system such as LINUX, WINDOWS, UNIX, hypervisor, or other similar high level software that a boot firmware engine of the computing device turns control of the computing device to. A hypervisor may be a system software that manages hardware and enables multiple instances of operating system to be created on the hardware.

Examples described herein provide mechanisms for automatically provisioning a computing device (e.g., a host computing device) with an operating system and network processing functions. In the examples described herein, provisioning a computing device with network processing functions may mean provisioning one or more NICs in the computing device with network processing functions so that the NIC(s) may offload these functions from a processor (e.g., CPU) of the computing device and/or one or more network processing devices. In an example, the NIC(s) may be orchestrated with network configurations (e.g., complex network configurations) to enable network processing functions on the NIC(s). In particular, the examples described herein provide mechanisms that initiate a network handling module, post OS installation while rebooting the computing device in a post-operating system environment for loading the operating system, to orchestrate NIC(s) with the complex network configurations to enable desired network processing functions on the NIC(s). The network handling module may be programed to execute configuring or programming of NIC(s) as an activity post OS installation (i.e., as a part of OS installation) while rebooting the computing device. Thus, such described examples may avoid any manual intervention, and thereby result in fully automatic OS installation along with NIC(s) (i.e., orchestrated NIC(s)) that may perform network processing functions.

As described in examples herein, the network handling module may be automatically initiated to perform the functionalities for configuring or programming the NIC while the reboot of the computing device for loading the operating system. As used herein, initiating the network handling module while rebooting the computing device may mean that the network handling module may be initiated immediately after the loading of the operating system is complete (described in detail below).

In an aspect, a method for provisioning a computing device is presented. The method includes providing a computing device in a pre-operating system environment. The computing device may include a network interface card (NIC) and a customized operating system (OS) package, which may include a first image file of operating system and a second image file of network orchestration. The second image file may include network configuration data, a NIC firmware corresponding to the NIC, and a network handling module. The method includes booting the computing device in the pre-operating system environment using the first image file to install an operating system for attaining a post-operating system environment and configure the NIC to enable network connectivity. The method may then include rebooting the computing device in the post-operating system environment for loading the operating system and automatically initiating the network handling module, using the second image file, for configuring or programming, by the NIC firmware, the NIC with the network configuration data to enable network processing functions on the NIC. As used herein, the term "rebooting" may refer to booting a computing device again, which is already booted previously. In an example, rebooting is the process by which a running computer device is shut down and restarted again.

The term "pre-operating system environment", as used herein, may refer to a computing environment of a computing device prior to installing an operating system to the computing device. In an example, a computing device without an operating system may be referred to as in a pre-operating system environment. As used herein, the term "post-operating system environment" may refer to a computing environment of a computing device after installing an operating system on the computing device. In an example, a computing device with an operating system installed on it may be referred to be in a post-operating system environment.

In another aspect, a computing device may include a processor, a memory coupled to the processor and a NIC coupled to the processor. The computing device may be provided in a pre-operating system environment for provisioning. The memory may include a customized OS package that may include a first image file of operating system and a second image file of network orchestration. The second image file may include network configuration data, a NIC firmware corresponding to the NIC and a network handling module. The network handling module may automatically get initiated for configuring or programing the NIC while rebooting the computing device in a post-operating system environment for loading an operating system. In an example, the network handling module may determine at least one of NIC configuration or a programming scheme defined by the NIC, read network configuration data from the second image file and then convert the network configuration data to device specific information according to the at least one of the NIC configuration or the programming scheme defined by the NIC. The network handling module may then instruct to the NIC firmware for configuring or programming the NIC using the device specific information to enable network processing functions on the NIC.

The systems and methods of the present subject matter are further described with reference to FIGS. 1-5, It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof. Although the one or more portions of the description herein are with reference to a single NIC in a computing system, the methods and described techniques may be utilized for several NICs. Various implementations of the present subject matter have been described below by referring to several examples.

Figure 1:
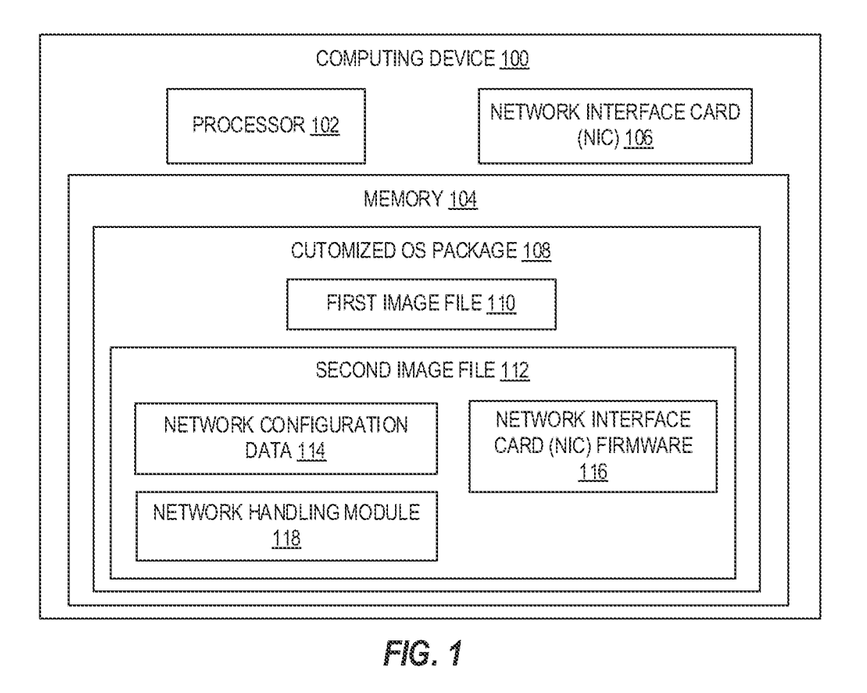
FIG. 1 is a schematic block diagram of an example computing device in a pre-operating system environment.

FIG. 1 schematically depicts an example computing device 100 in a pre-operating system environment, which may be automatically provisioned (as part of unattended OS installation technique) with operating system and network processing functions using the methods for provisioning, as described in the examples herein. Provisioning a computing device with network processing functions may mean provisioning a NIC in the computing device by orchestrating the NIC with network configurations so as to enable desired network processing functions on the NIC. The orchestrated NIC may perform the enabled network processing functions and offload these functions from the processor (e.g., central processing unit (CPU)) of the computing device and/or a network processing device implemented in a network.

The computing device 100 may include one or more internal communication networks such as a local area network (LAN). The computing device 100 may be communicatively coupled to one or more external communication networks such as a wide area network (WAN) through one or more network devices (e.g., switches) that may be implemented to provide communications link between the computing device 100 and resources available in the internal network and external network.

As depicted in FIG. 1, the computing device 100 may include a processor 102, a memory 104 communicatively coupled to the processor 102, and a network interface card (NIC) 106 communicatively coupled to the processor 102 through an internal interface such as PCIe (Peripheral Component Interconnect Express), CXL (Compute Express Link) or GenZ link. In addition to the processor 102, memory 104 and NIC 106, the computing device 100 may include one or more other components or resources that may be required for the desired functioning of the computing device 100.

The NIC 106 may provide network connectivity to a communication network, such as an Ethernet network, a local wireless network, and so forth. In an example, the NIC 106 may include an ASIC based, FPGA based, or a System-on-a-Chip (SOC) based processor. In the examples described herein, the NIC 106 may be orchestrated with complex network configurations (that may be provided as network configuration data 114) to enable desired network processing functions on the NIC 106. Although the computing device 100, as shown in FIG. 1, includes a single NIC, a computing device may include a plurality of NICs for high performance, availability, reliability, and ability to connect to multiple networks. In certain examples, a computing device may include two NICs.

The processor 102 may include a microprocessor, a microcontroller, a processor module or subsystem, a programmable integrated circuit, a programmable gate array, multiple processors, a microprocessor including multiple processing cores, or any other digital or analog circuitry configured to interpret and/or execute program instructions and/or process. In some examples, the processor 102 may interpret and/or execute program instructions and/or process data stored in memory 104. The memory 104 stores instructions executable by the processor 102. The memory 104 may include any computer-readable medium known in the art including, for example, volatile memory (e.g., RAM), non-volatile memory (e.g., EPROM, flash memory, etc.), magnetic storage or opto-magnetic storage.

Referring to FIG. 1, a customized OS package 108 may be provided in the computing device 100 in the pre-operating system environment. In an example, the customized OS package 108 may be implemented in the memory 104. The package may be created by a provider (e.g., manufacturer, vendor, reseller, etc.) according to the requirement of a client or a user. The customized OS package 108 may include a first image file 110 of operating system and a second image file 112 of network orchestration. The first image file 110 may comprise an operating system install image for installing an operating system, as well as additional instructions and/or data for executing installation of the operating system on the computing device 100, The second image file 112 of network orchestration may comprise network configuration data 114, a NIC firmware 116 corresponding to the NIC 106 and a network handling module 118. Network configuration data 114 may include one or more network configurations (e.g., complex network configurations). In an example, the network configuration data 114 may be a compilation of a plurality of network configurations that may be required to be configured or programmed on the NIC 106 to enable desired network processing functions on the NIC 106. The second image file 112 of network orchestration may facilitate in orchestrating the NIC 106 with the network configuration data 114 to enable corresponding network processing function(s) on the NIC 106. In an example, the second image file 112 may include any instructions for enabling orchestration of the NIC 106, with the network configuration data 114, to enable network processing functions on the NIC 106.

In the examples described herein, the first image file 110 may be implemented as a program of instructions that may be read by and executed on the processor 102 to carry out the installation of the operating system and automatically initiate the network handling module 118 for orchestrating the NIC 106. The installation of the operating system may occur during booting the computing device 100 in the pre-operating system environment. On completion of the installation, the operating system may be installed in the computing device 100, and the computing device 100 may attain the post-operating system environment. The first image file 110 may further include instructions to reboot the computing device 100 for loading the operating system. In addition, the first image file 110 may include instructions to register the network handling module 118 as a service in the programs to be provided by the operating system.

A NIC firmware may be a software program that controls and monitors various functions on the hardware of a NIC, In particular, a NIC firmware may include instructions that may be executed by a processor of the NIC, for performing various functions. A NIC firmware may be specific for a NIC. In some examples, the NIC firmware may be updated with a new version of software program (i.e., new version of NIC firmware) to keep the NIC up-to-date with the new version of software program to include additional functionalities/features. In the examples described herein, the NIC firmware 116 may be provided to the NIC 106 to control and monitor various operations performed on and/or by the NIC 106. In an example, the NIC firmware 116 may help in configuring or programming the NIC 106 with desired network configuration data 114 (as described in greater details below). In an example, the NIC firmware 116 may be updated with a new version of NIC firmware to include additional functionalities/features.

In the examples described herein, the network handling module 118 may comprise any system, device or apparatus that may enable orchestration of the NIC 106, with the network configuration data 114, to enable network processing functions on the NIC 106. As described in the examples herein, the network handling module 118 may be programmed to configure or program the NIC 106 with the network configuration data 114. In an example, the network handling module 118 may be implemented as a program of instructions that may be read by and executed on a processor (e.g., the processor 102) to configure or program the NIC 106, with the network configuration data 114, to enable network processing functions on the NIC 106.

In the examples described herein, the computing device 100 in the pre-operating system environment may be booted using the first image file 110 to install the operating system. On completion of booting the computing device 100, the operating system may be successfully installed in the computing device 100 and the NIC 106 may be configured with the basic network configurations (described previously) to enable network connectivity on the NIC 106. As the operating system may be installed on the computing device 100, the computing device 100 may attain the post-operating system environment. In an example, the network handling module 118 may be registered as a service in the programs to be provided by the operating system, while booting the computing device. The computing device 100 in the post-operating system environment may then automatically start rebooting (i.e., booted again after OS installation) for loading the operating system. On completion of loading the operating system, the programs (registered as services) may start interacting with the operating system (i.e., the services may start interacting to the kernel of the operating system). As the network handling module 118 may be registered as a service, the operating system may automatically initiate the network handling module 118 for performing the functionalities for configuring or programming the NIC 106 using the second image file 112. As described in the greater details below, the network handling module 118 may facilitate the process of configuring or programming the NIC 106 by the NIC firmware 116.

As described in the examples herein, initiating the network handling module 118 while rebooting the computing device 100 may mean that the network handling module 118 may be initiated immediately after the loading of the operating system is complete.

In some examples, the network handling module 118 may determine whether the NIC firmware 116 needs to be updated. In response to determining that the NIC firmware 116 needs to be updated, the network handling module 118 may facilitate updating of the NIC firmware 116 with a new version of the NIC firmware. The process of updating the NIC firmware 116 may be performed prior to the process of configuring or programming the NIC 106 with the network configuration data 114.

Non-limiting examples of the network processing functions that may be enabled on the NIC 106 may include network monitoring/reporting, encryption/decryption, intrusion detection/prevention, compression, firewall, Quality of Service (QoS) characteristics, access control list (AOL) characteristics, network bonding, application specific security policies, network services including Network Address translation, Virtual LAN (VLAN)/Virtual Extensible LAN (VXLAN) tunneling services, application specific security policies, routing policies, network partitioning, creating secure tunneling endpoint, affinitizing CPU for network card processing, programming new protocol, network protocol enablement, acceleration capability or combinations thereof.

The functionalities (i.e., final functionalities) of the NIC 106 may depend on what functions may be defined in the NIC 106 by configuring or programming the NIC 106 with the network configurations. For example, the network configurations that may enable Virtual LAN (VLAN)/Virtual Extensible LAN (VXLAN) tunneling services may include corresponding Virtual LAN (VLAN)/Virtual Extensible LAN (VXLAN) configurations. The network configurations that may enable security services (e.g., encryption/decryption and intrusion detection/protection) may include corresponding security configurations. The network configurations that may enable network bonding may include NIC bonding configurations. In some examples, the network configurations that may enable various network processing functions, which may be offloaded from the processor 102 and/or any network processing devices may include corresponding offload configurations.

In some examples, the NIC 106 may be pre-programmed with some network configurations to enable one or more network processing functions, hi these examples, the NIC 106 may be configured to enable the one or more network processing functions. In some examples, the NIC 106 may not be pre-programmed to enable one or more other network processing functions. In some such examples, the NIC 106 may be programmed to enable these one or more other network processing functions, e.g., security policies, network protocol enablement, application acceleration, network partitioning, routing policy etc.

The functionalities of a NIC, the availability of pre-programmed network configurations and ability to configure and/or program desired network configurations on the NIC may depend on its architecture and implementation. Different vendors or manufacturers may provide NICs with different architectures (e.g., ASIC, FPGA, and System-on-a-Chip (SOC)-based), and different implementations, which may depend on cost, ease of programming, and flexibility, Depending on its architecture and implementation, a NIC may have a specific NIC configuration and a specific programming scheme (or model) defined on the NIC. As used herein, the term "NIC configuration" may refer to a configuration of a NIC that defines the behaviors of existing predefined functionalities on the NIC. The term "programming scheme", as used herein, may refer to a set of semantics and interfaces that enable to create new functionalities by programming the NIC. Both the NIC configuration and the programming scheme may be unique to a NIC.

In order to communicate any information or data to and from the NIC, the information/data may need to be translated or converted to device specific information corresponding to a NIC. Device specific information may involve a sequence of steps and procedures as required by a device (e.g., a NIC) to perform a function on the device according to its scheme. In an example, device specific information corresponding to a NIC may represent the way and the sequence in which data (e.g., network configurations) can be exchanged and how the device be instructed to be configured and programmed on the NIC, based on at least one of the NIC configuration or the programming scheme of the NIC.

As described in the examples herein, the network handling module 118 may get initiated for configuring or programming the NIC 106 with the network configuration data 114 while rebooting the computing device in the post-operating system environment for loading the operating system. In accordance with the examples described herein, the network handling module 118 may first determine at least one of NIC configuration or a programming scheme of the NIC 106. In these examples, to determine at least one of the NIC configuration or the programming scheme of the NIC 106, the network handling module 118 may retrieve a unique identification, vendor details and metadata of the NIC 106, from the NIC 106 through the internal interface such as PCIe, CXL or GenZ link. The network handling module 118 may read the network configuration data 114 from the second image file 112.

As used herein, the term "unique identification" of a device or component may be based on the device class or the type of the component, Vendor ID (the make of the device or the component), and device ID or component ID. In one example, the unique identification may be Global Unique Identification Decimal (GUID) that includes a combination of Device class, Vendor ID, and device ID.

In some examples, on reading the network configuration data 114, the module 118 may validate network configuration(s) provided in the NIC configuration data 114 before configuring or programming that network configuration(s) on the NIC 106. As used herein, the term "validate" may mean that the module 118 may identify whether a network configuration is valid. A network configuration may be valid if that configuration is supported by the NIC 106, free of any error, and not contradicting to another network configuration. In some examples when the network handling module 118 may not validate a network configuration, that network configuration may not be configured on the NIC 106. In some examples when the network handling module 118 may identify two or more contradicting configurations, the network handling module may not validate one or more of the two or more network configurations. In some such examples, the network handling module 118 may resolve the contradiction by selecting one of the configurations based on the priority depending, partly, on the application and environment. For example, network partitioning and maintaining speed up to a value may be contradicting configurations in some scenarios. In such example, the network handling module 118 may identify the two contracting configurations and may not execute one or both the configurations. In an instance, depending on the priority, the network partitioning may take precedence, and the network handling module 118 may resolve the contraction by superseding network partitioning over speed.

After reading and validating the network configuration data 114, the network handling module 118 may convert the network configuration data 114 to device specific information (described above) corresponding to the NIC 106. That is, the data 114 may be converted to the device specific information based on at least one of the NIC configuration or the programming scheme of the NIC 106. After converting the data 114 to the device specific information, the network handling module 118 may then instruct the NIC firmware 116 for configuring or programming the NIC 106 using the device specific information. In this way, the NIC firmware 116 may configure or program the NIC 106 with the network configuration data 114 by using the device specific information to enable the corresponding network processing functions on the NIC 106. In some examples, the computing device 100 may be rebooted second reboot) again after the completion of the process of configuring or programming the NIC 106 for applying the configuration or programming performed on the NIC 106 to enable the network processing functions on the NIC 106. On successful completion of the process of configuring or programming the NIC 106, the NIC 106 may be orchestrated with the network configuration data 114 (in the form of the device specific information) and able to perform the corresponding network processing functions. After the completion of the reboot(s), the computing device 100 may include the operating system and the orchestrated NIC that may be capable of performing network processing functions.

In some examples, the computing device 100 may include more than one NIC. Such computing device may be depicted in FIG. 2 as an example computing device 200. The computing device 200 may include the NIC 106 (i.e., a first NIC) and a second NIC 206. The second NIC 206 may be different from the first NIC 106. In an example, the second NIC 206 may be provided by a different vendor than that of the first NIC 106. In such examples, the second NIC 206 may be different from the first NIC 106 in its architecture, implementation, configuration and/or programming scheme. In such examples, the second image file 112 may also include a second NIC firmware 216 corresponding to the second NIC 206 in addition to the NIC firmware 116 (i.e., a first NIC firmware).

Figure 2:
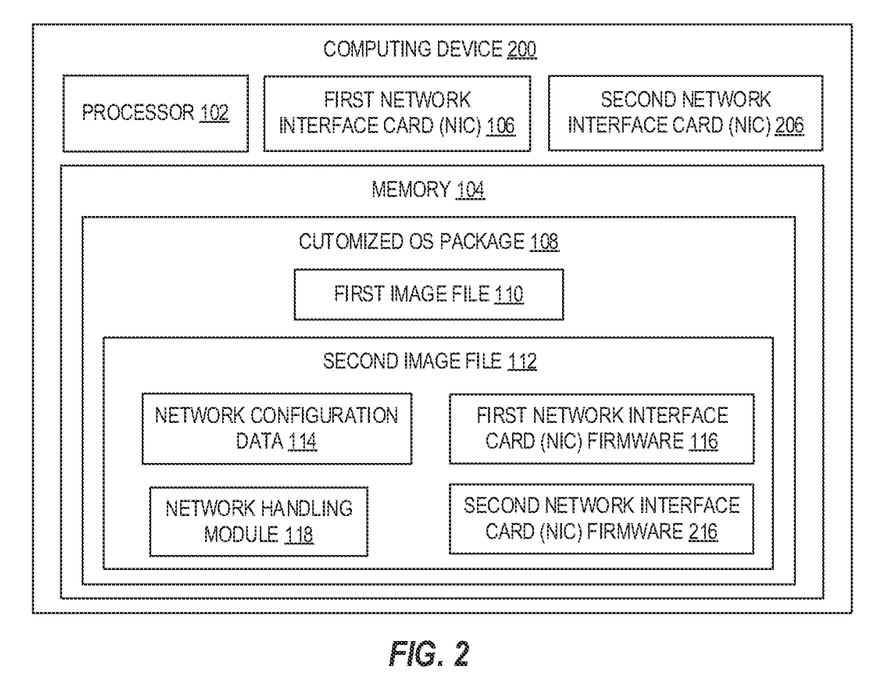
FIG. 2 is a schematic block diagram of another example computing device in a pre-operating system environment.

As described in the examples herein, while rebooting the computing device 200 in the post-operating system environment, the network handling module 118 may automatically get initiated to orchestrate the first NIC 106 and the second NIC 206 with the network configuration data 114 to enable the network processing functions on the first NIC 106 and the second NIC 206. In such examples, the network handling module 118 may determine at least one of a first NIC configuration or a first programming scheme of the first NIC 106 and at least one of a second NIC configuration or a second programming scheme of the second NIC 206. The network handling module 118 may read the network configuration data 114 and then convert the network configuration data 114, individually, to a first device specific information corresponding to the first NIC 106 (based on at least one of the first NIC configuration or the first programming scheme of the first NIC 106) and a second device specific information corresponding to the second NIC 206 (based on at least one of the second NIC configuration or the second programming scheme of the second NIC 206). The first NIC 106 and the second NIC 206 may then be configured or programmed, respectively, by the first NIC firmware 116 and the second NIC firmware 216. The first NIC 106 may be configured or programmed using the first device specific information to enable the network processing functions on the first NIC 106 and the second NIC 206 may be configured or programmed using the second device specific information to enable the network processing functions on the second NIC 206. In some examples, the computing device 200 may be rebooted (i.e., second reboot) again after the completion of the process of configuring or programming the first NIC 106 and the second NIC 206 for applying the configuration or programming.

As described herein, the described systems and methods provide automatic techniques for provisioning a computing device. In particular, the described examples may provide systems and methods for automatically orchestrating NIC(s) in the computing device with complex network configurations as part of OS installation on the computing device, Such fully automatic described techniques may offer several advantages for being simple, user-friendly and fast. As compared to available methods/techniques that involve discrete steps for configuring NIC(s) with various network configurations, the described techniques may be less prone to errors and provide much faster and efficient ways to configure NIC(s) with various complex network configurations. In some examples, the techniques may be advantageous in error-recovery by identifying contradicting configurations and resolving the contraction.

Figure 3:
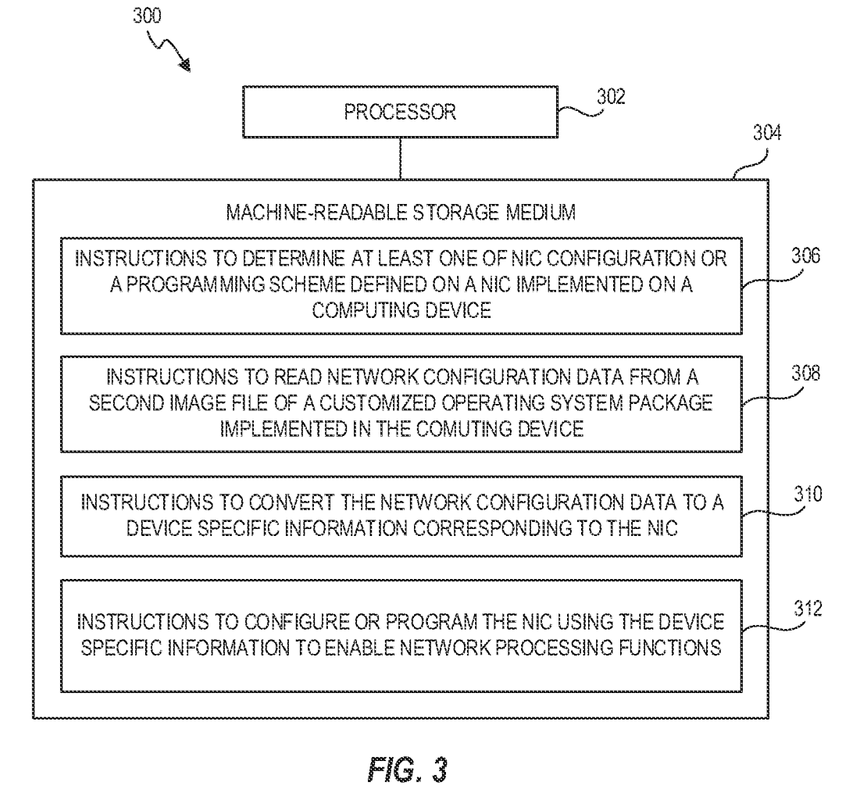
FIG. 3 is a block diagram depicting a processor and a machine-readable storage medium encoded with example instructions to configure or program a network interface card in a computing device, in accordance with an example.

FIG. 3 is a block diagram 300 depicting a processor 302 and a machine readable medium 304 encoded with example instructions for orchestrating a NIC in a computing device to enable network processing functions, while rebooting the computing device in a post-operating system environment as part of OS installation, for provisioning the computing device, in accordance with an example. The machine readable medium 304 may be non-transitory and may alternatively referred to as a non-transitory machine readable medium 304. In some examples, the machine readable medium 304 may be accessed by the processor 302. The processor 302 and the machine readable medium 304 may be included in a network handling module e.g., the network handling module 118. In some examples, the processor 302 may be a processor of a computing device (e.g., the processor 102 of the computing device 100) and the machine-readable medium 304 may be a memory (e.g., the memory 104) of the computing device that is being provisioned.

The machine readable medium 304 may be encoded with example instructions 306, 308, 310 and 312 (i.e., 306-312). The instructions 306-312 of FIG. 3, when executed by the processor 302, may implement various aspects of orchestrating a NIC (e.g., the NIC 106) in a computing device (e.g., the computing device 100 in FIG. 1). In particular, the instructions 306-312 of FIG. 3 may be useful for performing the functionalities of the network handling module 118 and the methods described below with respect to FIG. 5.

Non-limiting examples of the processor 302 may include a microcontroller, a microprocessor, central processing unit core(s), an application-specific integrated circuit (ASIC), a field programmable gate array (FPGA), etc. The machine readable medium 304 may be a non-transitory storage medium, examples of which include, but are not limited to, a random access memory (RAM), a read-only memory (ROM), an electrically erasable programmable read-only memory (EEPROM), a flash memory, a hard disk drive, etc. The processor 302 may execute instructions (i.e., programming or software code) stored on the machine readable medium 304. Additionally or alternatively, the processor 302 may include electronic circuitry for performing the functionality described herein.

The instruction 306, when executed, may cause the processor 302 to determine at least one of NIC configuration or a programming scheme of the NIC 106. The NIC configuration and programming scheme of the NIC 106 may be determined by retrieving unique identification, vendor details and metadata of the NIC 106. The instructions 308, when executed, may cause the processor 302 to read the network configuration data 114 from the second image file 112. In some examples, the instructions 308 may include instructions to validate (described previously) the network configuration data 114. The instructions 310, when executed, may cause the processor 302 to convert the network configuration data 114 to device specific information based on at least one of the NIC configuration or the programming scheme of the NIC 106. The instruction 312, when executed, may cause the processor 302 to instruct the NIC firmware 116 for configuring or programming the NIC 106 using the device specific information.

In examples as illustrated in FIG. 2, where the computing device 200 may include the first NIC 106 and the second NIC 206, the instructions 306, when executed, may cause the processor 302 to determine at least one of a first NIC configuration or a first programming scheme of the first NIC 106 and at least one of a second NIC configuration or a second programming scheme of the second NIC 206. The instructions 308, when executed, may cause the processor 302 to read the network configuration data 114 from the second image file 112. In some examples, the instructions 308 may include instructions to validate (described previously) the network configuration data 114. The instructions 310, when executed, may cause the processor 302 to convert the network configuration data 114 to a first device specific information based on at least one of the first NIC configuration or the first programming scheme of the first NIC 106 and a second device specific information based on at least one of the second NIC configuration or the second programming scheme of the second NIC 206. The instruction 312, when executed, may cause the processor 302 to instruct the first NIC firmware 116 for configuring or programming the first NIC 106 using the first device specific information and the second NIC firmware 216 for configuring or programming the second NIC 206 using the second device specific information to enable network processing functions on the first NIC 106 and the second NIC 206.

The instructions 306-312 may include various instructions to execute at least a part of the methods described in FIG. 5 (described below). Also, although not shown in FIG. 3, the machine readable medium 304 may include additional program instructions to perform various other method blocks described in FIGS. 5-6.

Figure 4:
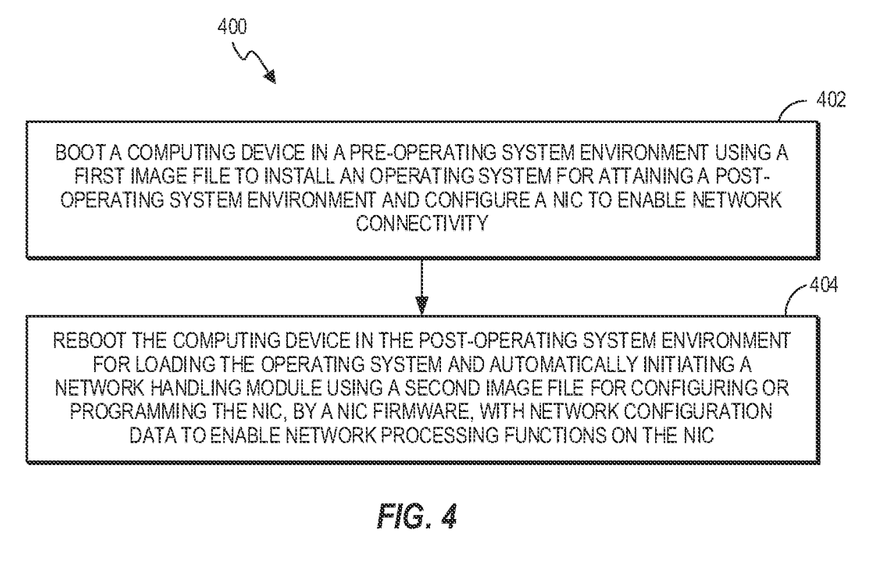
FIG. 4 is a flowchart of an example method for provisioning a computing device.

FIG. 4 depicts a flowchart of an example method 400 for provisioning a computing device (e.g., the computing device 100 in FIG. 1). For ease of illustration, the execution of method 400 is described in details below with reference to FIG. 1. In particular, the method 400 includes automatic provisioning of the computing device 100 involving OS installation and orchestrating the NIC 106 in the computing device 100 with network configurations to enable network processing functions on the NIC 106. Although the below description is described with reference to the computing device 100, however other computing devices suitable for the execution of method 400 may be utilized. In an example, the method 400 is performed by the processor 102. Additionally, implementation of method 400 is not limited to such examples. Although the flowchart of FIG. 4 shows a specific order of performance of certain functionalities, method 400 is not limited to such order. For example, the functionalities shown in succession in the flowchart may be performed in a different order, may be executed concurrently or with partial concurrence, or a combination thereof.

At method block 402, the method 400 may include booting the computing device 100 in the pre-operating system environment using the first image file 110 to install the operating system for attaining the post-operating system environment and configure the NIC 106 to enable network connectivity. On successful completion of the method block 402, the operating system may be installed in the computing device 100 and the NIC 106 may be configured with the basic network configurations (described previously) to enable network connectivity on the NIC 106. At this instant, the computing device 100 may be in the post-operating system environment. At method block 404, the method 400 may include rebooting the computing device 100, in the post-operating system environment, for loading the operating system. Immediately after the loading of the operating system is completed, the method 400, at method block 404, may include automatically initiating (described above) the network handling module 118 for configuring or programming the NIC 106, using the second image file 112, with the network configuration data 114 to enable the network processing functions on the NIC 106. In an example, the network handling module 118 may facilitate the process of configuring or programming the NIC 106 by the NIC firmware 116. This way, the network handling module 118 may facilitate configuring or programming the NIC 106 in the computing device 100 to enable network processing functions on the NIC 106.

Figure 5:
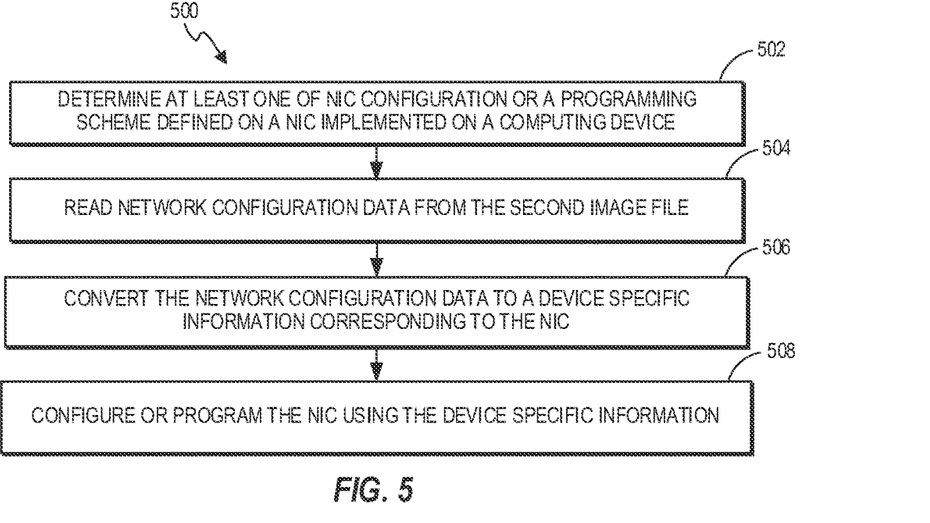
FIG. 5 is a flowchart of a method for configuring or programming a network interface card in a computing device while rebooting the computing device in a post-operating system environment, in accordance with an example.
Figure 6:
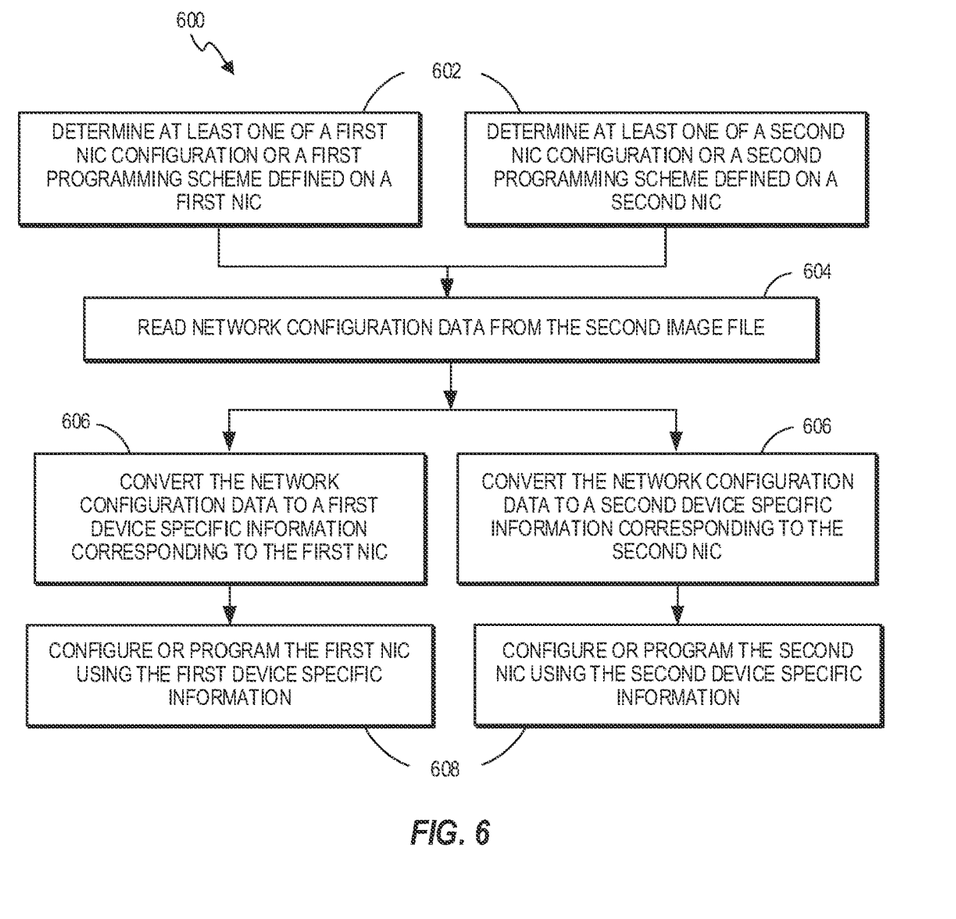
FIG. 6 is a flowchart of a method for configuring or programming a network interface card in a computing device while rebooting the computing device in a post-operating system environment, in accordance with another example.

FIGS. 5 and 6 depict flowcharts of example methods 500 and 600 for orchestrating NIC(s) in a computing device in a post-operating system environment. For ease of illustration, the execution of method 500 is described in details below with reference to FIG. 1 and the execution of method 600 is described in details below with reference to FIG. 2. In particular, the methods 500 and 600 include orchestration (i.e., configuration or programming) of the NIC(s) with network configurations to enable network processing functions on the NIC(s) while rebooting a computing device in the post-operating system environment as a part of OS installation. Although the below description is described with reference to the computing devices 100 and 200, however other computing devices suitable for the execution of methods 500 and 600 may be utilized. As will be appreciated, the methods 500 and 600 may be performed by the processor 102. In some examples, the method blocks of the methods 500 and 600 may be executed by the processor 302 by executing the instructions 306-312 stored in the machine readable medium 304. Additionally, implementation of methods 500 and 600 is not limited to such examples. Although the flowcharts of FIGS. 5 and 6 show a specific order of performance of certain functionalities, methods 500 and 600 are not limited to such order. For example, the functionalities shown in succession in the flowcharts may be performed in a different order, may be executed concurrently or with partial concurrence, or a combination thereof.

Referring to FIG. 5, at method block 502, the method 500 may include determining at least one of NIC configuration or a programming scheme of the NIC 106. In some examples, the at least one of the NIC configuration or the programming scheme of the NIC 106 may be determined from unique identification, vendor details and/or metadata of the NIC 106. In an example, the method 500 may include retrieving one or more of unique identification, vendor details, or metadata of the NIC 106. At method block 504, the method 500 may include reading the network configuration data 114 from the second image file 112. In an example, the network configuration data 114 may include network configurations to enable desired network processing functions on the NIC 106. In some examples, reading the network configuration data 114 may include validating (described previously) the network configuration data 114. In some examples, the method blocks 502 and 504 may be performed in a different order or concurrently. At method block 506, the method 500 may include converting the network configuration data 114 to device specific information (described previously) corresponding to the NIC 106. In the examples described herein, the network configuration data 114 may be validated prior to converting the network configuration data 114 to device specific information. In an example, the network configuration data 114 may be converted to the device specific information based on at least one of the NIC configuration or the programming scheme of the NIC 106. At method block 508, the method 500 may include instructing the NIC firmware 116 for configuring or programming the NIC 106 using the device specific information to enable corresponding network processing functions on the NIC 106. In some examples, the method 500 may further include rebooting the computing device 100 again after completion of the method block 508 for application of the desired configuration and programming.

In some examples, the method 500 may include determining whether the NIC firmware 116 needs to be updated. In response to determining that the NIC firmware 116 needs to be updated, the method 500 may include updating the NIC firmware 116 with a new version of NIC firmware prior to configuring or programming (i.e., the method block 508) the NIC 106 with the device specific information.

In the examples as illustrated in FIG. 2, the computing device 200 may include the first NIC 106 and the second NIC 206. In such examples, referring to FIG. 6, at method block 602, the method 600 may include determining at least one of a first NIC configuration or a first programming scheme of the first NIC 106 and at least one of a second NIC configuration or a second programming scheme of the second NIC 206. At method block 604, the method 600 may include reading the network configuration data 114 from the second image file 112. In some examples, reading the network configuration data 114 may further include validating (described previously) the network configuration data 114. At the method block 606, the method 600 may include converting the network configuration data 114 to a first device specific information corresponding to the first NIC 106 (based on at least one of the first NIC configuration or the first programming scheme of the first NIC 106) and a second device specific information corresponding to the second NIC 206 (based on at least one of the second NIC configuration or the second programming scheme of the second NIC 206). At method block 608, the method 600 may include instructing the first NIC firmware 116 for configuring or programming the NIC 106 using the first device specific information to enable the network processing functions on the first NIC 106. Further, the method 600, at method block 608, may include instructing the second NIC firmware 216 for configuring or programming the second NIC 206 using the second device specific information to enable the network processing functions on the second NIC 206. In some examples, the method 600 may further include rebooting the computing device 200 again after completion of the method block 608 for application of the desired configuration and programming.

In some examples, the method 600 may include determining whether the first NIC firmware 116, the second NIC firmware 216 or both the first NIC firmware 116 and the second NIC firmware 216 need to be updated. In response to determining that the first NIC firmware 116, the second NIC firmware 216 or both the first NIC firmware 116 and the second NIC firmware 216 need to be updated, the method 600 may include updating the first NIC firmware 116, the second NIC firmware 216 or both the first NIC firmware 116 and the second NIC firmware 216 with corresponding new versions of NIC firmware prior to configuring or programming (i.e., the method block 608) the first NIC 106 with the first device specific information and the second NIC 206 with the second device specific information.

As described in the examples herein, the NIC(s) (the first NIC 106, the second NIC 206 or both) may be configured or programmed with multiple complex network configurations that may be compiled in the network configuration data 114. In some examples, configuring or programming of the NIC(s) with a complex network configuration may fail during the process. In response to such a failure, the method, as described herein, may include restoring a previously configured or programmed network configuration on the NIC(s). That is, the NIC(s) may be able to perform the network processing function(s) corresponding to the network configurations that may be successfully configured or programmed on the NIC(s). In some examples, in response of failure of all complex network configurations that might have been configured or programmed on the NIC(s), the method may include restoring the basic network configuration (e.g., L3 configuration) on the NIC(s) to retain network connectivity.

Figure 7:
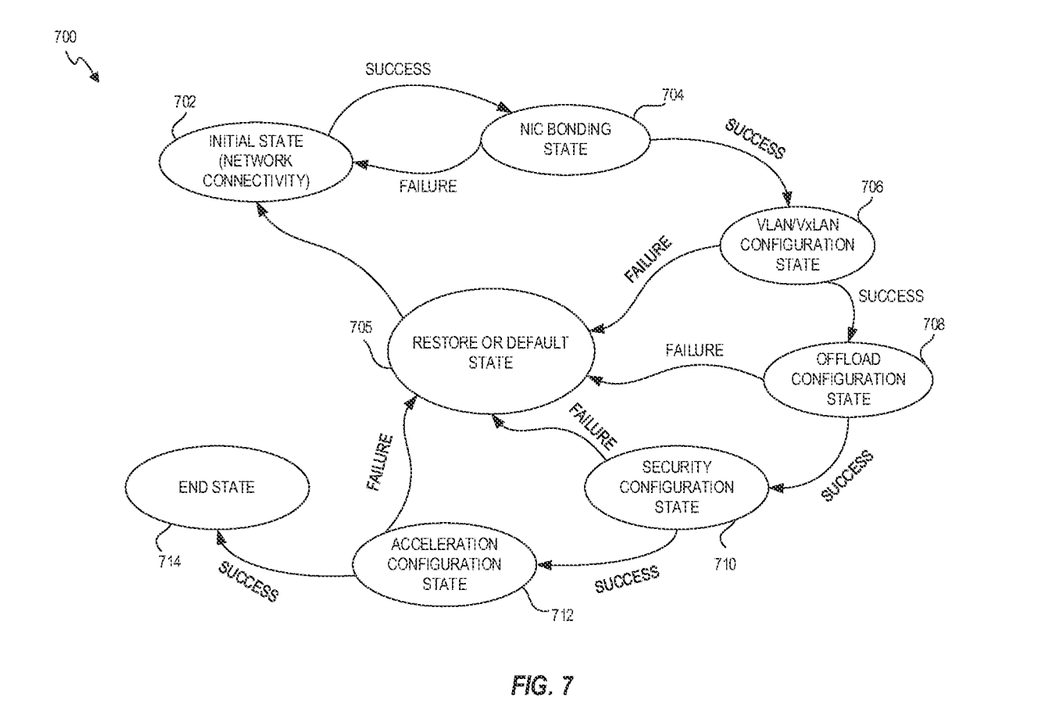
FIG. 7 is a state transition diagram illustrating exemplary operations of configuring or programming a plurality of network configurations on NICs in a computing device while rebooting the computing device in a post-operating system environment.

FIG. 7 depicts a state transition diagram 700 illustrating exemplary operations of configuring or programming complex network configurations on the NICs (e.g., the first NIC 106 and the second NIC 206) in a computing device (e.g., the computing device 200) while provisioning the computing device to enable corresponding network processing functions, as described in the examples herein. For ease of illustration, the execution of state transition of FIG. 7 is described with reference to FIG. 2. In an example, the computing device 200 may be in an initial state 702 in the post-operating system environment, where an operating system may be installed and NICs (106, 206) might have configured to have network connectivity (L3 configuration).

On rebooting the computing device 200, the operating system may be loaded on the computing device 200. After the operating system is loaded, the computing device 200 via the network handling module 118 may be automatically initiated for configuring or programming the NICs (106, 206) with complex network configurations (that may be complied in the network configuration data 114) one by one. First, the computing device 200 may enter to an NIC bonding state 704 where a first operation of NIC bonding may be performed on the NICs (106, 206). In examples where the first operation fans, the computing device 200 may restore the initial state 702.

In examples where the first operation is successful, the computing device 200 may continue and enter to a VLAN/VXLAN configuration state 706 where a second operation of configuring the NICs (106, 206) with VLAN/VXLAN configuration may be performed. In examples where the second operation fails, the computing device 200 may enter to a restore or default state 705. In the restore or default state 705, the computing device 200 may restore a previously configured or programmed network configuration or a default configuration. In the example where the second operation fails, the computing device 200 may restore the initial interface state 702 or the NIC bonding state 704.

In examples where the second operation is successful, the computing device 200 may continue and enter to an offload configuration state 708 where a third operation of offloading certain functions from the processor 102 to the NICs (106, 206) may be performed. In examples where the third operation fails, the computing device 200 may enter to the restore or default state 705. In such examples, the computing device 200 may restore the initial interface state 702, the NIC bonding state 704 or VLAN/VXLAN configuration state 706.

In examples where the third operation is successful, the computing device 200 may continue and enter to security configuration state 710 where a fourth operation of configuring security functionalities (e.g., encryption/decryption) to the NICs (106, 206) may be performed. In examples where the fourth operation fails, the computing device 200 may enter to the restore or default state 705. In such examples, the computing device 200 may restore the initial interface state 702, the NIC bonding state 704, the VLAN/VXLAN configuration state 706 or the offload configuration state 708.

In examples where the fourth operation is successful, the computing device 200 may continue and enter to acceleration configuration state 712 where a fifth operation of configuring the NICs (106, 206) with acceleration configurations may be performed. In examples where the fifth operation fails, the computing device 200 may enter to the restore or default state 705. In such examples, the computing device 200 may restore the initial interface state 702, the NIC bonding state 704, the VLAN/VXLAN configuration state 706, the offload configuration state 708 or the security configuration state 710. In examples where the fifth operation is successful, the computing device 200 may attain an end state 714 where the NICs (106, 206) may be successfully configured with desired network configurations, and may be able to perform corresponding network processing functions as described above. Similarly, an additional network configuration to the NICs (106, 206) may be performed, in some examples.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

We claim:

1. A method for provisioning a computing device, comprising:
   providing the computing device in a pre-operating system environment, the computing device comprising:
      a first network interface card (NIC); and
      a memory storing a customized operating system (OS) package comprising a first image file for an OS, and a second image file for NIC orchestration comprising network configuration data, a first NIC firmware corresponding to the first NIC, and a network handling module;
   booting the computing device in the pre-operating system environment using the first image file to install the OS for attaining a post-operating system environment and configuring the first NIC to enable network connectivity;

executing instructions in the first image file to register the network handling module in the second image file as a service to be provided by the OS;

rebooting the computing device in the post-operating system environment for loading the OS;

automatically initiating, by the OS, the network handling module responsive to the network handling module being registered as the service to be provided by the OS; and configuring or programming, by the network handling module initiated by the OS, the first NIC using the network configuration data in the second image file to enable a network processing function on the first NIC by:

determining, by the network handling module, at least one of a first NIC configuration or a first programming scheme defined for the first NIC;

reading, by the network handling module, the network configuration data from the second image file, wherein reading the network configuration data comprises identifying a plurality of contradicting configurations and selecting one of the contradicting configurations by superseding network partitioning over speed;

converting, by the network handling module, the network configuration data to first device specific information corresponding to the first NIC according to the at least one of the first NIC configuration or the first programming scheme defined for the first NIC; and instructing, by the network handling module, the first NIC firmware to configure or program the first NIC using the first device specific information.

2. The method of claim 1, wherein the network processing function comprises a processing activity related to security, performance, and customization in a network.

3. The method of claim 1, wherein the network processing function comprises at least one selected from among: encryption/decryption, intrusion detection/prevention, compression, a firewall function, a Quality of Service (QoS) function, an access control list (ACL) function, network bonding, address translation, Virtual LAN (VLAN)/Virtual Extensible LAN (VXLAN) tunneling, security, routing, network partitioning, or creating a secure tunneling endpoint.

4. The method of claim 1, further comprising:
determining, by the network handling module, whether the first NIC firmware is to be updated; and
in response to determining that the first NIC firmware is to be updated, updating the first NIC firmware prior to the configuring or programming of the first NIC.

5. The method of claim 1, wherein the determining of the at least one of the first NIC configuration or the first programming scheme defined for the first NIC comprises retrieving a unique identification, vendor details, and metadata of the first NIC.

6. The method of claim 1, wherein the selecting the one of the contradicting configurations validates the network configuration data.

7. The method of claim 1, wherein the computing device further comprises a second NIC that is different from the first NIC, the second image file further comprises a second NIC firmware corresponding to the second NIC, and wherein the method further comprises:
configuring or programming, by the second NIC firmware, the second NIC with the network configuration data to enable the network processing function on the second NIC.

8. The method of claim 7, wherein the configuring or programming the second NIC comprises:

determining, by the network handling module, at least one of a second NIC configuration or a second programming scheme defined for the second NIC;

converting, by the network handling module, the network configuration data to second device specific information corresponding to the second NIC according to the at least one of the second NIC configuration or the second programming scheme defined for the second NIC; and instructing, by the network handling module, the second NIC firmware to configure or program the second NIC using the second device specific information.

9. The method of claim 8, wherein the determining of the at least one of the second NIC configuration or the second programming scheme defined for the second NIC comprises retrieving a unique identification, vendor details, and metadata of the second NIC.

10. The method of claim 8, wherein the at least one of the first NIC configuration or the first programming scheme defined for the first NIC is different than the at least one of the second NIC configuration or the second programming scheme defined for the second NIC.

11. The method of claim 1, wherein the customized OS package comprises network configuration data for a plurality of network configurations, and the configuring or programming of the first NIC further comprises configuring or programming the first NIC with each network configuration of the plurality of network configurations to enable a plurality of network processing functions on the first NIC.

12. The method of claim 1, further comprising:
in response of a failure while configuring or programming the first NIC with the network configuration data to enable the network processing function, restoring a previously configured or programmed network configuration on the first NIC.

13. A non-transitory machine-readable storage medium comprising instructions that upon execution cause a processor to:
in a computing device in a pre-operating system environment, the computing device comprising the processor, a first network interface card (NIC), and a memory storing a customized operating system (OS) package comprising a first image file for an OS and a second image file for NIC orchestration comprising network configuration data, a first NIC firmware corresponding to the first NIC, and a network handling module:
install the OS in the computing device using the first image file; and
execute instructions in the first image file to register the network handling module in the second image file as a service to be provided by the OS;
cause a reboot of the computing device in a post-operating system environment for loading the OS;
automatically initiate, by the OS, the network handling module responsive to the network handling module being registered as the service to be provided by the OS;
determine, by the network handling module, at least one of a first NIC configuration or a first programming scheme defined for the first NIC;
read, by the network handling module, the network configuration data from the second image file, wherein reading the network configuration data comprises identifying a plurality of contradicting configurations and selecting one of the contradicting configurations by superseding network partitioning over speed;

convert, by the network handling module, the network configuration data to first device specific information corresponding to the first NIC according to the at least one of the first NIC configuration or the first programming scheme defined for the first NIC; and instruct, by the network handling module, the first NIC firmware to configure or program the first NIC using the first device specific information to enable a network processing function on the first NIC.

14. The non-transitory machine-readable storage medium of claim 13, wherein the instructions to determine the at least one of the first NIC configuration or the first programming scheme defined for the first NIC comprise instructions to retrieve a unique identification, vendor details, and metadata of the first NIC.

15. The non-transitory machine-readable storage medium of claim 13, wherein the instructions to select the one of the contradicting configurations validates the network configuration data.

16. The non-transitory machine-readable storage medium of claim 13, wherein the network processing function comprises a processing activity related to security, performance, and customization in a network.

17. The non-transitory machine-readable storage medium of claim 13, wherein the instructions upon execution cause the computing device to:

determine, by the network handling module, whether the first NIC firmware is to be updated; and in response to determining that the first NIC firmware is to be updated, update the first NIC firmware prior to the instructing.

18. The non-transitory machine-readable storage medium of claim 13, wherein the computing device further comprises a second NIC that is different from the first NIC, the second image file further comprises a second NIC firmware corresponding to the second NIC, and the instructions further comprise instructions that upon execution cause the computing device to:

determine at least one of a second NIC configuration or a second programming scheme defined for the second NIC;

convert the network configuration data to second device specific information corresponding to the second NIC according to the at least one of the second NIC configuration or the second programming scheme defined for the second NIC; and instruct the second NIC firmware to configure or program the second NIC using the second device specific information to enable the network processing function on the second NIC.

19. The non-transitory machine-readable storage medium of claim 18, wherein:

the instructions to determine the at least one of the first NIC configuration or the first programming scheme defined by the first NIC comprise instructions to retrieve unique identification, vendor details, and metadata of the first NIC, and the instructions to determine the at least one of the second NIC configuration or the second programming scheme defined by the second NIC comprise instructions to retrieve a unique identification, vendor details, and metadata of the second NIC.

20. A computing device comprising:

a network interface card (NIC);

a memory storing a customized operating system (OS) package comprising a first image file for an OS and a second image file for network orchestration, the second image file comprising network configuration data, a NIC firmware corresponding to the NIC, and a network handling module;

a processor; and a non-transitory storage medium storing instructions executable on the processor to:

boot the computing device in a pre-operating system environment using the first image file to install the OS for attaining a post-operating system environment and configuring the NIC to enable network connectivity;

execute instructions in the first image file to register the network handling module in the second image file as a service to be provided by the OS;

reboot the computing device in the post-operating system environment for loading the OS;

automatically initiate, by the OS, the network handling module responsive to the network handling module being registered as the service to be provided by the OS;

determine, by the network handling module, at least one of a NIC configuration or a programming scheme defined for the NIC;

read, by the network handling module, the network configuration data from the second image file, wherein reading the network configuration data comprises identifying a plurality of contradicting configurations and selecting one of the contradicting configurations by superseding network partitioning over speed;

convert, by the network handling module, the network configuration data to device specific information corresponding to the NIC according to the at least one of the NIC configuration or the programming scheme defined for the NIC; and instruct, by the network handling module, the NIC firmware to configure or program the NIC using the device specific information to enable a network processing function on the NIC.

* * * * *